(12) United States Patent
Zaccaro et al.

(10) Patent No.: US 8,380,532 B1
(45) Date of Patent: Feb. 19, 2013

(54) METHOD AND APPARATUS FOR ACCURATE PRICE ESTIMATION IN REVERSE DISTRIBUTION OF PHARMACEUTICAL ITEMS

(75) Inventors: Michael J. Zaccaro, Libertyville, IL (US); David Malecki, Genoa City, WI (US)

(73) Assignee: Returns R Us, Inc., Mundelein, IL (US)

( * ) Notice: Subject to any disclaimer, the term of this patent is extended or adjusted under 35 U.S.C. 154(b) by 381 days.

(21) Appl. No.: 12/556,397

(22) Filed: Sep. 9, 2009

(51) Int. Cl.
*G06Q 50/00* (2012.01)

(52) U.S. Cl. ............................................. 705/2

(58) Field of Classification Search .................. 705/1, 2, 705/9, 26, 27, 28; 703/1; 700/115
See application file for complete search history.

(56) References Cited

U.S. PATENT DOCUMENTS

| | | | | |
|---|---|---|---|---|
| 2003/0093328 | A1* | 5/2003 | Koons | 705/26 |
| 2004/0039658 | A1* | 2/2004 | Hume et al. | 705/26 |
| 2004/0138921 | A1* | 7/2004 | Broussard et al. | 705/2 |
| 2005/0096941 | A1 | 5/2005 | Tong | |
| 2005/0216365 | A1* | 9/2005 | Lagge | 705/27 |
| 2005/0216368 | A1* | 9/2005 | Wechsel | 705/28 |
| 2006/0178905 | A1* | 8/2006 | Ayers et al. | 705/1 |
| 2006/0277110 | A1 | 12/2006 | Witter et al. | |
| 2008/0004844 | A1* | 1/2008 | Kefford et al. | 703/1 |
| 2008/0071410 | A1* | 3/2008 | Azzouz et al. | 700/115 |
| 2009/0048895 | A1* | 2/2009 | Hickey et al. | 705/9 |

OTHER PUBLICATIONS

Office Action in U.S. Appl. No. 12/556,391, dated Oct. 6, 2011.

* cited by examiner

*Primary Examiner* — John Pauls
(74) *Attorney, Agent, or Firm* — Marshall, Gerstein & Borun LLP

(57) ABSTRACT

In a reverse distribution environment, a technique for generating an accurate refund estimate for a pharmaceutical item returnable for credit by a customer to a manufacturer includes receiving item information that includes an identity of the pharmaceutical item, retrieving a pricing rule record for the pharmaceutical item that specifies an amount of credit expected to be received for the item, generating a refund estimate for the customer using the expected amount, receiving a credit memorandum that specifies an actual amount of credit payable by the manufacturer for the pharmaceutical item, comparing the actual amount of credit to the refund estimate, and adjusting the pricing rule record if the actual amount of credit is not equal to the refund estimate, subject to certain conditions.

20 Claims, 15 Drawing Sheets

FIG. 6A

TO ACME DRUG MANUFACTURING, INC.
DEBIT #: 111AB
WHOLESALER: ABC DISTRUBUTION, INC.

| NDC | LOT # | DESCRIPTION | QUANTITY | EXPIRATION | PRICE | AMOUNT |
|---|---|---|---|---|---|---|
| 12345-6789-00 | 12345 | ABC OINTMENT 3.5GM | 30 | 1/15/2009 | $3.49 | $104.7 |
| 12345-6587-99 | 12224 | XYZ HEART MEDICATION | 10 | 2/30/2009 | $11.00 | $110.00 |
| 12345-7865-90 | 34512 | XXX SOLUTION 5 ML | 1 | 5/30/2009 | $5.50 | $5.50 |
| 12345-4551-34 | 34511 | ZYX DROPS 2 ML | 5 | 4/30/2009 | $2.50 | $12.50 |

FIG. 6B

CREDIT #: XYZ-1234
FROM: ACME DRUG MANUFACTURING, INC.
DEBIT #: 111AB
WHOLESALER: ABC DISTRUBUTION, INC.

| DATE | DESCRIPTION | ITEM IDENTITY | QUANTITY | PRICE | AMOUNT | NOTES |
|---|---|---|---|---|---|---|
| 5/5/2009 | ABC OINTMENT 3.5GM | 12345-6789-00 LOT 12345 EXP. 1/15/2009 | 30 | $3.49 | $104.7 | |
| 5/5/2009 | XYZ HEART MEDICATION | 12345-6587-99 LOT 12224 EXP. 2/30/2009 | 10 | $9.69 | $96.9 | PRICE REDUCED |
| 5/5/2009 | XXX SOLUTION 5 ML | 12345-7865-90 LOT 34512 EXP 5/30/2009 | 1 | $8.54 | $8.54 | |

ACME DRUG MANUFACTURING, INC.

CREDIT MEMO (MANUFACTURER): XYZ-1234
CREDIT MEMO (WHOLESALER):

EXPECTED TOTAL: $468.99    CREDIT TOTAL: $423.03

| JOB # | NDC # | DESCRIPTION | LOT | EXP. DATE | PACK SIZE | PARTIALS | FULLS | EXPECTED | RECEIVED | TO APPLY | REASON |
|---|---|---|---|---|---|---|---|---|---|---|---|
| 17856 | 12345-6789-00 | ABC OINTMENT 3.5GM | 12345 | 1/15/2009 | 4 | 0 | 3 | $104.7 | $104.7 | $104.7 | |
| 17856 | 12345-6587-99 | XYZ HEART MEDICATION | 12224 | 2/30/2009 | 1 | 0 | 10 | $110.00 | $96.9 | $104.7 | PRICE |
| 17856 | 12345-7865-90 | XXX SOLUTION 5 ML | 34512 | 5/30/2009 | 1 | 0 | 1 | $5.50 | $8.54 | $104.7 | PRICE |
| 17934 | 12345-4551-34 | ZYX DROPS 2 ML | 34511 | 4/30/2009 | 5 | 0 | 1 | $12.50 | $0.0 | $0.0 | POLICY |

Batch Job Entry

Job Number: 18818
Return Program: WHOLESALER_ABC_RETURNS
Return Type: Government

| Attach | Job # | Facility Name | Job Date | Received | Debit Number |
|---|---|---|---|---|---|
| ☐ | | FACILITY_A | | | |
| ☐ | 12887 | FACILITY_B | 09/28/2007 | 09/28/2007 | PLG01-12887 |
| ☐ | 15268 | FACILITY_C | 08/06/2008 | 08/06/2008 | PLG01-15268 |
| ☐ | 15361 | FACILITY_D | 08/18/2008 | 08/18/2008 | PLG01-15361 |
| ☐ | 15473 | FACILITY_E | 08/28/2008 | 08/28/2008 | PLG01-15473 |
| ☐ | 15476 | FACILITY_F | 08/28/2008 | 08/28/2008 | PLG01-15476 |
| ☐ | 15571 | FACILITY_G | 09/11/2008 | 09/11/2008 | PLG01-15571 |
| ☐ | 15835 | FACILITY_H | 09/29/2008 | 09/29/2008 | PLG01-15835 |
| ☐ | 15836 | FACILITY_I | 09/29/2008 | 09/29/2008 | PLG01-15836 |
| ☐ | 15837 | FACILITY_J | 09/29/2008 | 09/29/2008 | PLG01-15837 |
| ☐ | 16314 | FACILITY_K | 11/25/2008 | 11/25/2008 | PLG01-16314 |
| ☐ | 16382 | FACILITY_L | 12/04/2008 | 12/04/2008 | PLG01-16382 |
| ☐ | 16383 | FACILITY_M | 12/04/2008 | 12/04/2008 | PLG01-16383 |
| ☐ | 16398 | FACILITY_N | 12/05/2008 | 12/05/2008 | PLG01-16398 |
| ☐ | 16475 | FACILITY_O | 12/15/2008 | 12/15/2008 | PLG01-16475 |

☐ Only list jobs in batch

[Close]

METHOD AND APPARATUS FOR ACCURATE PRICE ESTIMATION IN REVERSE DISTRIBUTION OF PHARMACEUTICAL ITEMS

FIELD OF TECHNOLOGY

The present disclosure relates generally to reverse distribution and, in particular, to generating accurate estimates and disbursements.

BACKGROUND

A variety of manual and automated techniques have been developed for efficient forward distribution (or simply distribution) of items from a supplier to multiple parties. As a result, today forward distribution in most industries is a relatively uncomplicated task. Suppliers such as manufacturers, distributors, or wholesalers use widely available software applications to process purchase orders and payments, generate invoices, and perform other activities common in forward distribution.

By contrast, reverse distribution is less developed and, in many ways, more complicated. Generally speaking, reverse distribution involves collection of unused or unsold items from customers and returning these items to manufacturers or wholesalers for cash, credit, exchange, or other benefit. Customers participating in reverse distribution may be retailers, government entities, non-commercial organizations, or even households or individuals. Some of the challenges customers and suppliers encounter when dealing with reverse distribution are the scarcity of convenient shipping options, the complexity of tracking the flow of items and credit, the abundance of pricing options, etc.

One area in which reverse distribution has proven to be particularly important is the pharmaceutical industry. As is known, manufactures of pharmaceuticals often buy back expired, defective, or simply unsold items from pharmacies, hospitals, and other organizations to prevent leakage of these items into the black market, and to generally encourage accurate supervision and accounting of pharmaceuticals. A typical pharmacy may thus have an option to ship certain items back to the respective manufacturers for a percentage of the purchase price. However, because forward distribution of pharmaceuticals usually proceeds via relatively few large distributors, it may be logistically difficult for the pharmacy to identify the manufacturer of each item and ship the item to the proper manufacturer. For example, one distributor may supply a pharmacy with items from tenths or even hundreds of manufacturers to make forward distribution easy and convenient for the pharmacy. The reverse procedure, on the other hand, may be too cumbersome for the pharmacy to implement.

To address reverse distribution needs of pharmacies, hospitals, and other organizations, some companies provide a service of collecting pharmaceutical items and returning these items to the corresponding manufacturers on behalf of their clients. These companies, which may be referred to as reverse distributors, coordinate the flow of items, money, and information between a large number of manufacturers on the one hand, and an even larger number of clients on the other hand. The process of reverse distribution is accordingly complex and resource-intensive. Further, repurchasing of pharmaceuticals is often subject to multiple complicated conditions. Still further, forward distribution of a certain items may be associated with numerous pricing options which may affect the repurchase price of the item by the manufacturer.

These and many other factors make reverse distribution of pharmaceuticals difficult to implement in a precise manner. Meanwhile, customers expect accuracy, efficiency, and reliability from the services offered by reverse distributors.

SUMMARY

A system operating in a reverse distribution environment efficiently and accurately facilitates collection of items from retailers and other customers, shipment of the collected items to the appropriate manufacturers or distributors, tracking of the collected and shipped items, and disbursement of credit to the customers. To this end, a reverse distributor operates a warehousing facility to which customers ship items packaged and organized in any manner convenient to the customers. At an early processing stage, the reverse distributor sorts the received items according to customers, manufacturers, and types of items. Similar items from the same customer are grouped together to simplify processing. The identity and quantity of each received item (or group of similar items) are then organized into a line item, and entered into a computer system which creates an identifier for each line item for use in subsequent tracking. The items from different customers are then grouped and shipped according to manufacturer identity. Each manufacturer, distributor, or another type of a supplier to which at least some of the items were shipped supplies the reverse distributor with a credit memorandum, or a statement indicating an amount of credit allocated for each returned item. Upon receiving credit memoranda from the relevant suppliers, the reverse distributor uses the line item information stored in the computer system to match the credit memoranda with the precise types and quantities of items received from the customers, and accurately credit each customer in accordance with the actual amounts of credit received from each supplier.

In some embodiments, the system additionally generates a refund estimate projecting the amount of credit the customer will receive from the one or multiple manufacturers for the items returned via the reverse distributor. One or several databases store pricing information for some or all types of items shipped to the reverse distributor, policy information specifying manufacturer- or distributor-specific rules according to which returned items are credited, customer-specific information, as well as data describing the items at different stages of processing by the reverse distributor. Some of these databases may be populated and maintained by the reverse distributor, while others may be provided by a third party via an internet connection, for example. In an embodiment, the computer system uses credit memoranda to adjust pricing and policy data in the corresponding database to continually improve the quality of refund estimates.

In some embodiments, the reverse distribution system processes pharmaceuticals and similar items, and the suppliers are manufacturers or distributors of pharmaceuticals, nutraceuticals, vitamins, etc. The reverse distribution system identifies items using at least some of the National Drug Code (NDC), the lot number assigned by the respective manufacturer, and the expiration date. To efficiently identify pricing, policy, and other relevant parameters, the reverse distribution system categorize customers into several classes of trade such as retailers (e.g., commercial pharmacies), hospitals, and government entities (e.g., government-run pharmacies or hospitals).

In an embodiment, a method in a reverse distribution environment for generating an accurate refund estimate for a pharmaceutical item returnable for credit by a customer to a manufacturer includes receiving an item information specifying an identity of the pharmaceutical item, retrieving a pricing rule record for the pharmaceutical item from a database, where the pricing rule record specifies at least an estimated amount of credit expected to be received from the manufacturer for the pharmaceutical item, generating a refund estimate for use by the customer, where the refund estimate is based on at least the estimated amount, receiving a credit memorandum indicative of an actual amount of credit payable by the manufacturer for the pharmaceutical item, comparing the actual amount of credit to the estimated amount of credit, and conditionally adjusting the pricing rule record if the actual amount of credit is not equal to the estimated amount of credit.

BRIEF DESCRIPTION OF THE DRAWINGS

FIG. 6A illustrates an example format of a debit memorandum which the reverse distributor of FIG. 1 may transmit to a supplier or a wholesaler.

FIG. 6B illustrates an example format of a credit memorandum which the reverse distributor of FIG. 1 may receive from a supplier.

FIG. 7 depicts example user interface for line item reconciliation implemented in a computer system of the reverse distributor illustrated in FIG. 1.

FIG. 13 illustrates an example interface screen for editing pricing data of a pharmaceutical product for several classes of trade and several wholesalers.

FIG. 14 illustrates an example interface screen for identifying processing jobs associated with a specified batch.

FIG. 15 illustrates an example interface screen for identifying a batch with which a selected processing job is associated.

DETAILED DESCRIPTION

Figure 1:
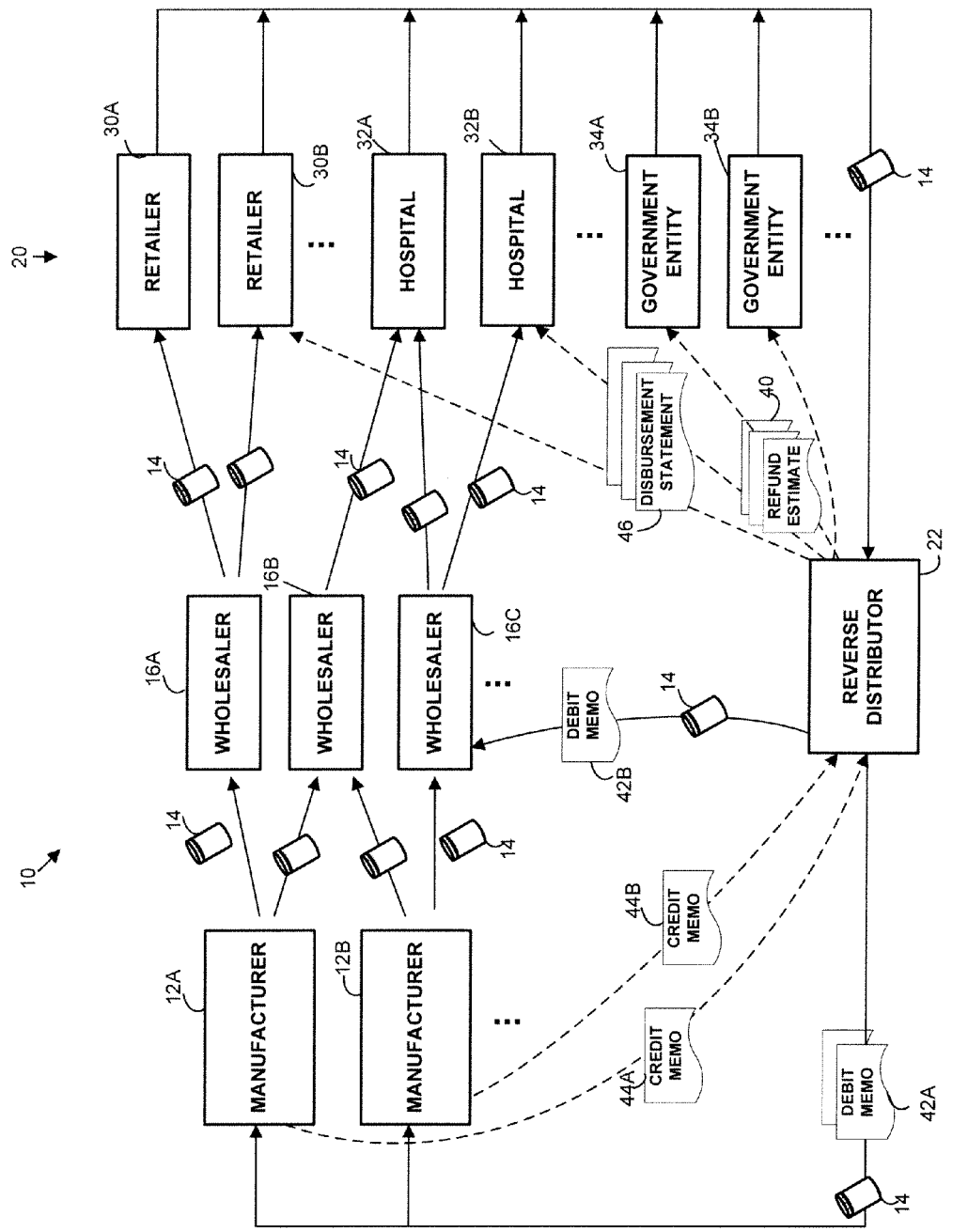
FIG. 1 schematically illustrates an environment in which a reverse distributor implements the techniques discussed herein to facilitate the return of unused pharmaceutical items from customers to suppliers or wholesalers.

FIG. 1 illustrates a distribution environment 10 in which multiple manufacturers 12A and 12B distribute items 14 via distributors or wholesalers 16A, 16B, and 16C to customers 20, and a reverse distributor 22 collects unsold items 14 from the customers 20 and reverse-distributes these items to the corresponding manufacturers 12A-B or the wholesalers 16A-C. Using the techniques discussed herein, the reverse distributor 22 tracks items 14 being returned to the appropriate entities, generates highly accurate refund estimates for the customers 20, processes credit information to precisely identify the amount of credit allocated by the manufactures 12A and 12B for each returned item 14, and otherwise facilitates the flow of items 14, information, and credit between the parties 12A-B, 16A-C, and 20. The reverse distributor 22 may retain an agreed-upon percentage of the allocated credit, charge a regular subscription fee, or offer another type of a financial arrangement to the customers 20. By way of example, the distribution environment 10 in general, and the reverse distributor 22 in particular, are discussed below with reference to the pharmaceutical industry.

The items 14 in this example include prescription and over-the-counter drugs, nutraceuticals, vitamins, beauty products, controlled substances, and other types of products which collectively may be referred to as "pharmaceutical items." Accordingly, the manufactures 12A and 12B are drug companies that typically produce thousands of types of pharmaceutical items. In the United States, the Food and Drug Agency (FDA) requires that each pharmaceutical item 14 be registered with a globally unique National Drug Code (NDC), and be further labeled with a lot number and an expiration date. The FDA assigns a portion of the NDC number, and specifies the format according to which the manufacturers 12A-B must assign the rest of the NDC number (see www-.fda.org). Although usually unique for a particular manufacturer, lot number is not a globally unique identifier because multiple manufacturers may use the same lot number with different products.

The customers 20 may include retailers 30A-B such as commercial pharmacies, hospitals 32-B, and government entities 34A-B which may be pharmacies, hospitals, or clinics run by the federal or state government. It is typical for drug manufacturers or distributors to offer pharmaceutical items at different prices to each of the groups defined by the entities 30A-B, 32A-B, and 34A-B. Accordingly, the retailers 30A-B may be considered to belong to one class of trade, the hospitals 32A-B may be considered to belong to another class of trade, and the government entities 34A-B may be considered to belong to yet another class of trade. Of course, the distribution environment 10 in general may include any number of classes of trade, and each corresponding group of the customers 20 may include any number of members. Moreover, it is also possible for a customer 20 to belong to multiple classes of trade: the retailer 32A, for example, may offer certain pharmaceuticals both to war veterans at discount prices, and to the public at large at retail prices. For ease of explanation, however, the examples discussed below assume that each customer 20 belongs to only one class of trade. It will be further noted that the distribution environment 10 may include any number of manufacturers 12A-B and wholesalers 16A-C.

For reasons mentioned above, the drug manufacturers 12A-B usually offer to buy back unsold pharmaceutical items 14 from the customers 20, often at a substantial price (e.g., 70% of the originally paid price). Each of the manufactures 12A-B, however, may subject the respective offer to numerous, and possibly idiosyncratic, conditions. For example, the manufacturer 12A may refuse to accept partially filled containers, while the manufacturer 12B may buy back only prescription items. Moreover, the manufactures 12A-B may frequently update the respective buy back policies for individual products, categories of products (e.g., heart medication, blood pressure medication, etc.), or all products in genera). In some situations, the manufacturers 12A-B do not wish to process returns directly, and ask that the customers 20 ship the unsold items 14 to the manufacturers 16A-C.

When returning items 14 to the manufacturers 12A-B or wholesalers 16A-C, the customers 20 may thus choose to ship these items to the reverse distributor 22. To simplify the process of reverse distribution for the customers 20, the reverse distributor 22 does not require that the items 14 be organized or packaged according to any particular order. As a result, an individual shipment may include items 14 associated with different manufacturers 12A-B, different expiration dates, different product categories, etc. In response to receiving a shipment from one of the customers 20, the reverse distributor 22 may generate a refund estimate 40 for each shipment and send the refund estimate 40 to the respective customer 20 electronically (e.g., mail, web site update, etc.), by facsimile, as a paper document, or in any desired manner. The refund estimate 40 may specify the amount which the reverse distributor 22 expects the corresponding manufacturer 12A-B to credit for each returned item. If desired, the refund estimate 40 may be formatted according to a custom format specified by the customer 20.

Upon processing the items 14, the reverse distributor 22 may prepare debit memoranda 42A-B listing the relevant details regarding the items 14 being returned (e.g., identity of each of the items 14 including NDC, lot number, and expiration date; quantity associated with each item; the estimated repurchase price of each item; and other parameters, if desired). As illustrated in FIG. 1, the reverse distributor 22 in some cases may ship the items 14 and the corresponding example memorandum 42A directly to one of the manufacturers 16A-B, while in other cases the reverse distributor 22 may ship the items 14 to one of the wholesalers 16A-C along with the debit memorandum 42B. Because the drug manufacturers 12A-B sometimes authorize the wholesalers 16A-C to destroy the returned items 14, and credit the customers 20 upon receiving an appropriate proof of destruction, the debit memorandum 42B may specify the proper procedure for destroying pharmaceuticals to the corresponding wholesaler 16A-C. In other cases, the debit memorandum 42B may include instructions related to returning the items 14 to the appropriate manufacturer 12A-B.

The reverse distributor 22 may then ship the items 14 to the manufacturers 12A-B or the distributors 16A-C and receive, some time later, a corresponding credit memorandum 44A or 44B from the corresponding one of the manufacturers 12A-B. The manufacturers 12A-B may format the credit memoranda 44A-B according to the account practices of each manufacturer, but every credit memorandum 44A or 44B preferably indicates the amount of credit allocated (or to be allocated in the future) for each item 14. Using the credit memoranda 44A-B, the reverse distributor 22 may then calculate precise amounts of credit to be disbursed to each customer 20. If desired, the reverse distributor 22 may also report these amounts to the customers 20 via respective disbursement statements 46.

To consider one specific simplified example of reverse distribution, the retailer 30A may wish to return $N_1$ units (e.g., pills) of a pharmaceutical item 14 having the NDC code $NDC_1$, expiration date $D_1$, and lot number $L_1$ to the manufacturer 12A via the reverse distributor 22, and the hospital 32B similarly may wish to return $N_2$ units of the same pharmaceutical item 14 (i.e., having the same code $NDC_1$) with a different expiration date $D_2$, and lot number $L_2$. Applying the so-called batch processing technique known today, a reverse distributor typically submits $N_1+N_2$ units together to the manufacturer 12A, receives credit for the submitted units from the manufacturer 12A, and distributes the received credit among the retailer 30A and the hospital 32B on a pro rata basis. However, the manufacturer 12A may assign different prices to the units received from the retailer 30A and the hospital 32B based on the different expiration dates $D_1$ and $D_2$, different lot numbers $L_1$ and $L_2$, or according to some other principle. It is possible, for the example, that the manufacturer 12A has not allocated any credit for the $N_2$ units while having credited the $N_1$ units at 60% of the retail price. Thus, the techniques known today fail to account for items 14 that are associated with the same product but are in fact different items for the purposes of reverse distribution in general.

By contrast, the reverse distributor 22 associates the $N_1$ units of the example item discussed above with a line item $LI_1$, and the $N_2$ units of the same item with a line item $LI_2$. In some embodiments, each line item corresponds to a three-element tuple including an NDC, a lot number, and an expiration date. The reverse distributor 22 then stores the data descriptive of the line times $LI_1$ and $LI_2$ in a database, as discussed in more detail below with reference to FIG. 3. Upon receiving the credit memoranda 44A-B, the reverse distributor 22 identifies the amounts of credit corresponding to each of the line items $LI_1$ and $LI_2$, and identifies the precise amounts of credit to be allocated to the retailer 30A and the hospital 32B according to their respective contributions.

Moreover, the reverse distributor 22 may use the information in the credit memoranda 44A-B to continually improve the accuracy of refund estimates 40. To this end, the reverse distributor 22 may store pricing and return policy information for each individual product (i.e., item 14 with a particular NDC) and each class of trade in a computer-readable memory, and adjust this information upon detecting discrepancies between the amounts listed in the refund estimates 40 and the actual amounts specified in the credit memoranda 44A-B. For example, prior to processing the return of products with the NDC code $NDC_1$ to the manufacturer 12A, the reverse distributor 22 may associate the code $NDC_1$ in the retail category with a price $P_1$. The refund estimate 40 for the retailer 30A may accordingly indicate that the $N_1$ items are expected to be credited based on the price $P_r$. Upon processing the credit memorandum 44A, the reverse distributor 22 may discover that the manufacturer 12A credits the returns of the product with the code $NDC_1$ at the price $P_1'$, if the product is processed as a retail item. The reverse distributor 22 may conditionally (i.e., in view of the reported reason for the discrepancy between $P_1$ and $P_1'$) update the price of the product with the code $NDC_1$ in the retail category to $P_1'$.

Figure 2:
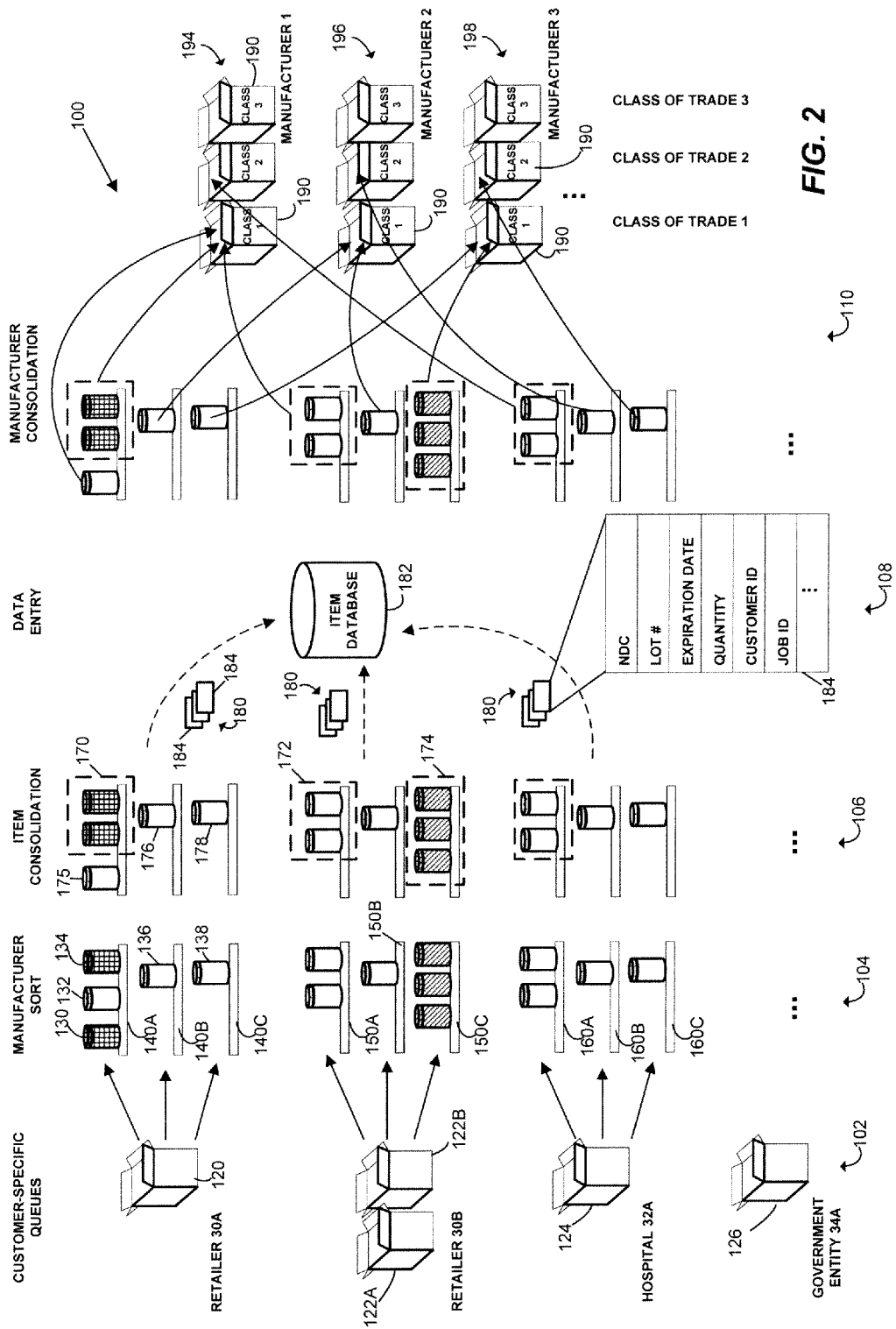
FIG. 2 illustrates the flow of pharmaceutical items through a warehousing facility, as well as entry of the associated data into a computer system, of the of the reverse distributor of FIG. 1.
Figure 3:
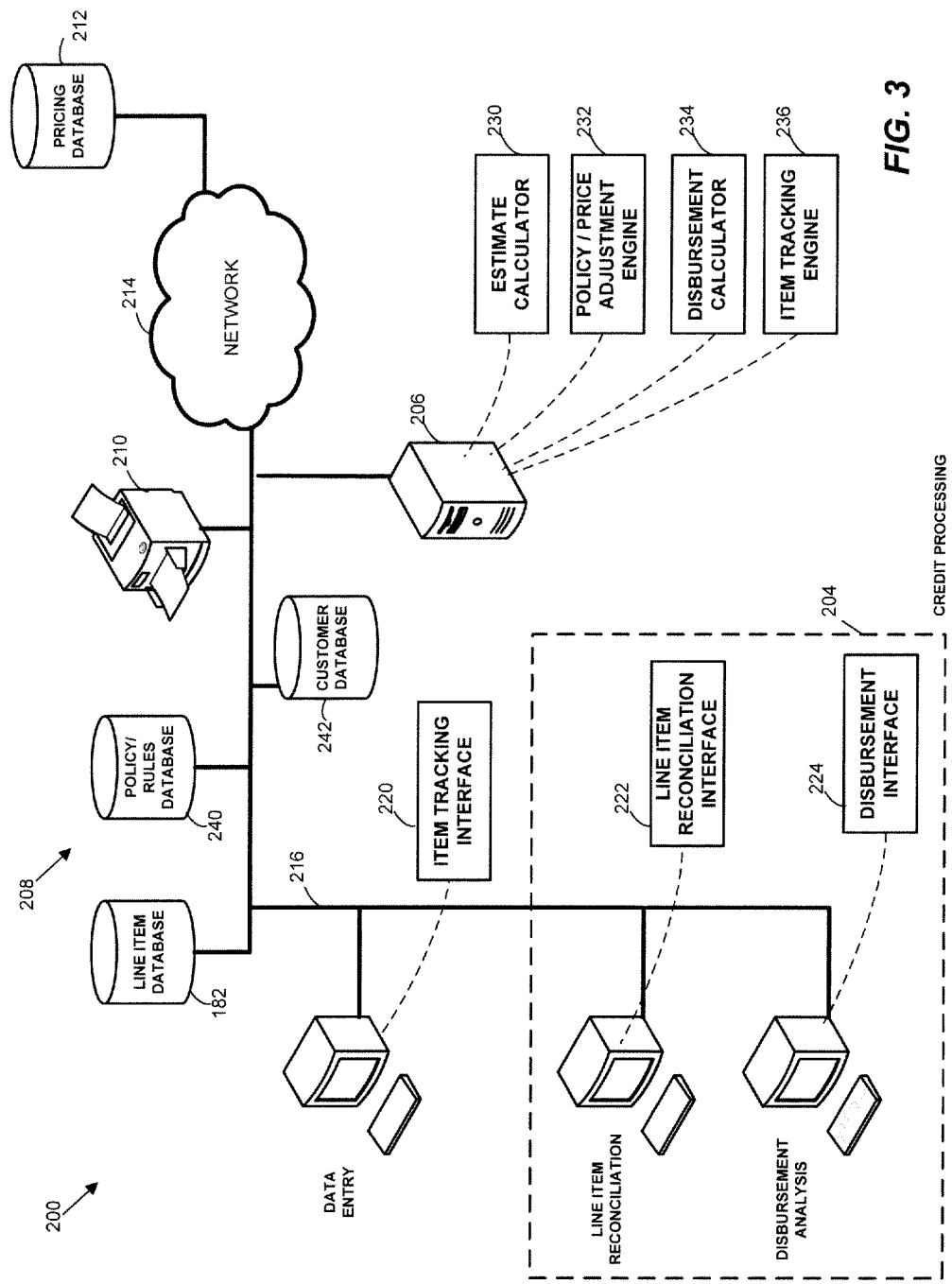
FIG. 3 is a block diagram of a computer system of the reverse distributor of FIG. 1.
Figure 4:
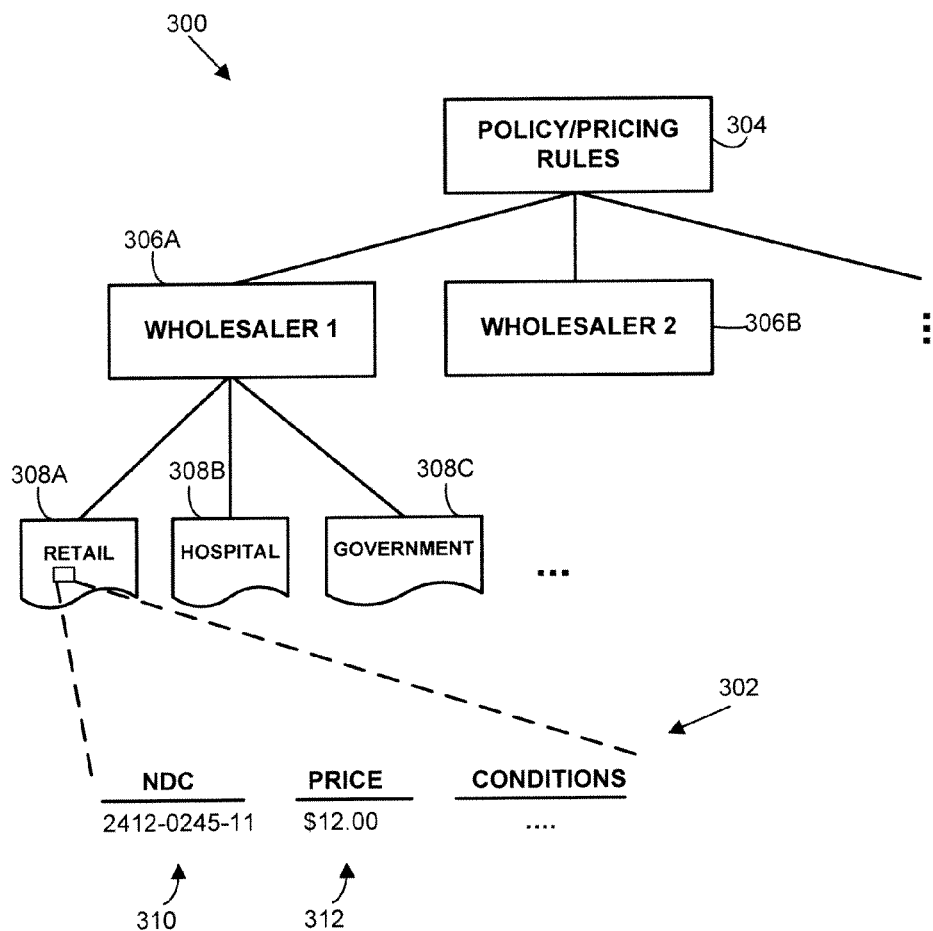
FIG. 4 is a block diagram that illustrates the structure of pricing records in a database of the reverse distributor of FIG. 1.
Figure 5:
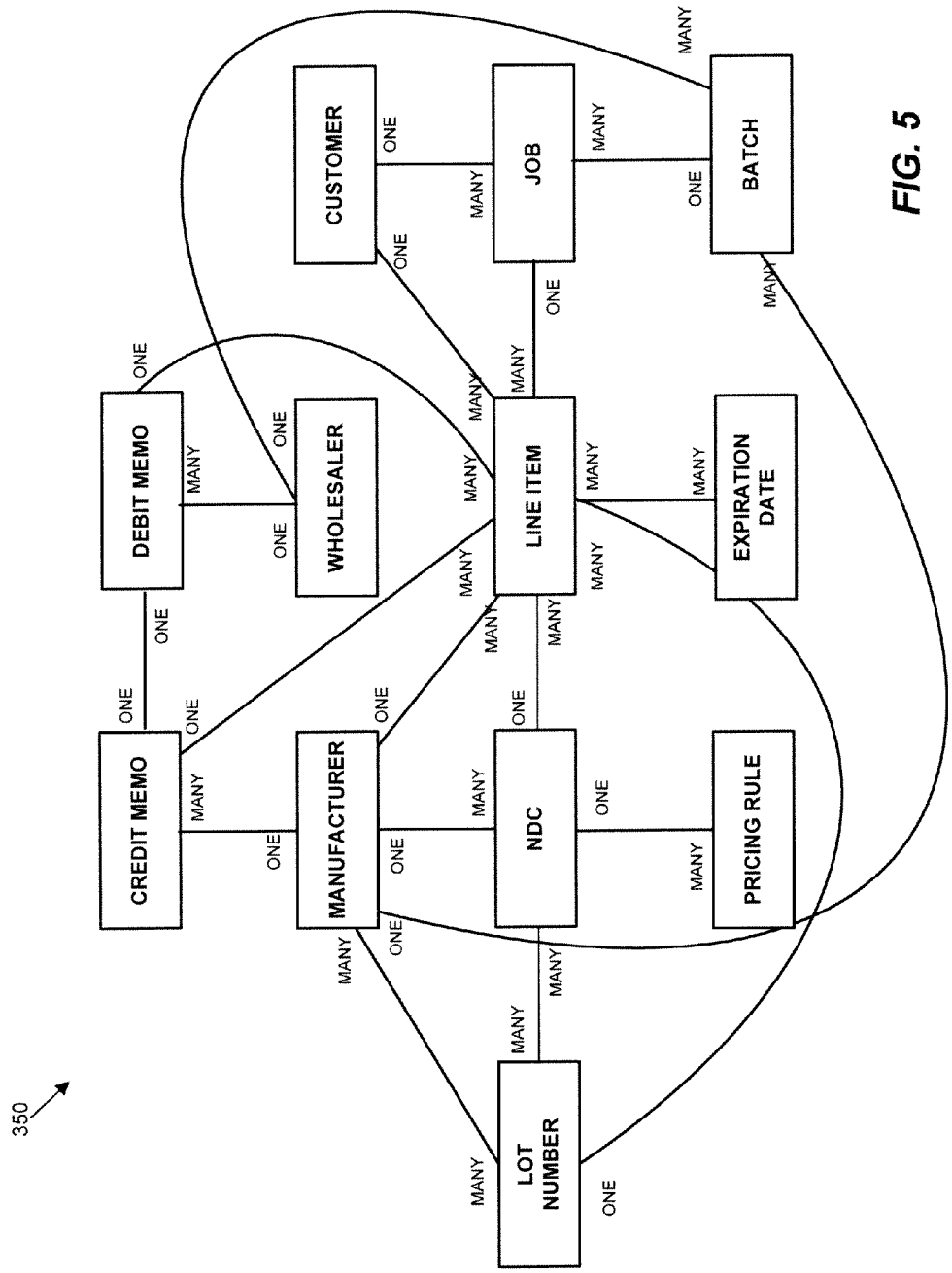
FIG. 5 is a diagram that illustrates logical relationships between some of the variables and parameters used by the reverse distributor of FIG. 1.

The cases discussed above are merely examples of the advantages the reverse distributor 22 provides to the customers 20 and manufacturers 12A-C. In general, the reverse distributor 22 implements techniques which collectively are referred to herein as precision processing. These techniques, and the corresponding system for adjusting pricing and policy data, generating accurate estimates, and providing accurate disbursements to customers are discussed next with references to FIGS. 2-12. To better explain the flow of items 14 through the warehousing facility of the reverse distributor 22 and several data entry stages, FIG. 2 schematically illustrates the reception, sorting, registration, and packaging of items for shipping to the corresponding manufacturers 12A-B or wholesalers 16A-C. FIG. 3 then illustrates an example computer system of the reverse distributor 22, and FIGS. 4 and 5 illustrate several example relationships between data structures used by the computer system of FIG. 3.

Referring to FIG. 2, the item process area 100 of the reverse distributor 22 may include or implement an item reception and shelving stage 102, a bulk sort stage 104, a pre-sort stage 106, a data entry stage 108, a manufacturer consolidation stage 110, and a closing stage (not shown), at least some of which may be partially or fully automated. In this example, the reverse distributor 102 may receive a shipment 120 from the retailer 30A, shipments 124A-B from the retailer 30B, a shipment 32A from the hospital 124, and a shipment 126 from the government entity 34A. At the item reception and shelving stage 102, the shipments 120-126 which may be boxes, envelopes, crates, or other containers of any size, may be placed into first-in-first-out (FIFO) customer-specific queues. Optionally, the reverse distributor 22 may identify and isolate those of the shipments 120-126 that include controlled substances, preferably based on the labeling of the corresponding containers.

Each of the shipments 120-126 may include one or multiple pharmaceutical items corresponding to one or multiple products identifiable by the respective NDC code. Further, some of the items corresponding to the same product may be packaged in different quantities or, as may be the case with certain pills, may be placed in similar containers that are differently filled. At the bulk sort stage 104, the shipments 120-126 may be sorted according to specific manufacturers. As one example, the shipment 120 may include items 130-138 associated with the manufactures 12A, 12B (see FIG. 1), and 12C (not shown in FIG. 1). In particular, an item 130 may be a container with 100 one-milligram-strong pills of medication $M_1$ produced by the manufacturer 12A, an item 132 may be a 20-milliliter bottle of medication $M_2$ similarly produced by the manufacturer 12A, and an item 134 may be a container of 50 one-milligram-strong pills of medication $M_1$. The items 130-134 accordingly may be placed into a queue 140A dedicated to the manufacturer 12A. The queue 140A may be physically implemented as a shelf, a separate container, a cart, etc.

To continue with the example of FIG. 2, the shipment 120 may further include an item 136 corresponding to a container with medication $M_3$ produced by the manufacturer 12B, and an item 138 corresponding to a container with medication $M_4$ produced by the manufacturer 12C. The queues 140B may 140C may be used to temporarily hold items identified as products of the manufacturers 12B and 12C, respectively. Further, similar queues 150A-C, 160A-C, etc. may be used to process the customers 30B, 32A, and others. The queues 150A and 160A may thus correspond to the manufacturer 12A, the queues 150B and 160B may correspond to the manufacturer 12B, and the queues 150C and 160C may correspond to the manufacturer 12C. In some embodiments, the separation between queues 140A, 150A, and 160A is only logical, in that each queue corresponds to the same physical area utilized at different times to process the customers 30A, 30B, 32A, etc. In other embodiments, each of the customers 30A, 30B, 32A, etc. is processed in parallel, and the separation between the queues 140A, 150A, and 160A (as well as between the queues 140B, 150B, 160B, and 140C, 150C, 160C) is both logical and physical.

At the pre-sort stage 106, similar items may be grouped together to define a smaller set of consolidated items, also referred to herein as line items. With continued reference to FIG. 2, the items 130 and 134 may have the same expiration date, and an operator (or, in some embodiments, an automated system in cooperation with a robotic arm) may logically group these items into a single consolidated or line item 170 that includes 150 pills of medication $M_1$. In other embodiments, the reverse distributor 22 may impose requirements on item consolidation that may be less or, conversely, more stringent than those discussed above. As one example of a less stringent requirement, the reverse distributor 22 may group items corresponding to the same product even if these items have different expiration dates. In this case, the reverse distributor 22 may still require that consolidated items expire in the same month, for example, or alternatively not impose this additional requirement at all. On the other hand, an example of a more stringent requirement may be the condition that each container have the same number of pills, for example.

FIG. 2 also illustrates additional examples of item consolidation (e.g., line items 172 and 174), as well as individual items (such as the items 132, 136 and 138) that cannot be grouped with other items and thus define respective line items 175, 176, and 178 by themselves. In general, line items may include any number of individual items and may generally be defined according to any desired set of consolidation principles. However, each line item preferably allows the reverse distributor 22 to avoid ambiguity and confusion at a later stage when credit memoranda 44A-B are received.

Next, at the data entry stage 108, an operator or an automated component may enter line item data 180 into a line item database 182. The line item data 180 may include multiple individual entries 184, one of which is partially illustrated in an exploded view in FIG. 2. As discussed in more detail with reference to FIG. 3, an operator may interact with the database 182 with an interface that accepts such input parameters as, for example, the NDC, the lot number, the expiration date, and the quantity for each line item 170, 172, 176, etc. Further, each line item entry 184 may specify the identity of the corresponding customer 30A, 30B, etc. which may be a number, an alphanumeric string, or any other suitable identifier. If desired, the line item entries 184 may also include a number or alphanumeric string that specifies the job number, i.e., an identifier that conceptually links the items 130-138, for example, in subsequent processing. More specifically, it may be desirable to know which of the items being returned to different manufacturers came from the same shipment (or at least the same customer). In this example, the reverse distributor 22 may associate each of the items 130-138 with a job identity $J_1$, each of the items from the shipment 122A with a job $J_2$, each of the items from the shipment 122B with a job $J_3$, etc. In some situations, the shipments 122A and 122B may be associated with the same job identity.

Of course, additional parameters and identifiers may also be entered into the database 180 at the data entry stage 108. At the subsequent stage 110, the reverse distributor may consolidate line items being returned to the same manufacturer, potentially including those that come from different one of the customers 30A, 30B, 32A, and 34A. Line items are preferably consolidated according to both manufacturers and classes of trade. By way of example, FIG. 2 schematically illustrates that all items from the retailer shipments 120, 122A, and 122B are placed into "class 1" shipment containers 190 of the manufacturer-specific queues 192-194, while all items from the hospital shipment 124 are placed into "class 2" containers. In general, the reverse distributor 22 may define and use any number of classes of trade.

Finally, at the closing stage not illustrated in FIG. 2, the reverse distributor may prepare packing lists, mail labels, return authorization forms, and other relevant documents which may be necessary or useful when shipping the containers 190 to the manufacturers 12A-C (or distributors 16A-C, as the case may be).

Of course, some of the stages 102-110 in other embodiments may be further divided into sub-stages or, conversely, merged into fewer stages. In general, it will be noted that FIG. 2 provides merely one example of processing and registering of the items 14 at a facility maintained by the reverse distributor 22, and the techniques discussed herein are also applicable to reverse distribution of pharmaceuticals or other items that proceeds according to other schemes.

Now referring to FIG. 3, a computer system 200 of the reverse distributor 22 may include one or several data entry stations 202, a credit processing sub-system 204, an analytical sub-system 206, a database sub-system 208, and one or multiple printers 210. Each of the data entry stations 202 may be a personal computer, a workstation, a portable computer, or any other device having a processor, a memory, an input device such as a keyboard, and an output device such a monitor. The computer system 200 may be communicatively connected to a third-party pricing database 212 or other external data providers via a network 214 which may be the Internet, for example. The sub-systems and components of the computer system 200 may be interconnected via an Ethernet connection 216 or in any other manner such as wirelessly, for example. In operation, operators interact with the computer system 200 via an item tracking user interface 220 of the data entry stations 202, a line item reconciliation interface 222 of the credit processing sub-system 204, a disbursement analysis 224 interface of the sub-system 204, or via administrative or control interfaces (not shown). Using the information entered via the interfaces 220-224, stored in the database sub-system 208, and received via the network 214, the analytical sub-system 206 accurately and efficiently tracks the flow of items, credit, and information. In particular, an estimate calculator 230 generates refund estimates 40; a policy/price adjustment engine 232 adjusts policy and pricing information based on the credit memoranda 44A-B and optionally in view of the third-party pricing database 212; a disbursement calculator 234 generates disbursement information for each of the customers 20; and an item tracking engine 236 monitors the processing of items and, in particular, of line items by the reverse distributor 22.

As discussed above with reference to FIG. 2, operators enter line item data 180 into the item database 182 to specify the identity of a product, the quantity in which the product is being returned, etc. To this end, the item tracking interface 220 may present to operators one or multiple GUI, text-only, or any other type of interface screens. The item tracking interface 220 may then communicate with the line item database 182 via the Ethernet connection 216.

In addition to the line item database 182, the database sub-system 208 may include a policy/rules/pricing database 240 which stores data specifying the return policy of each manufacturer 12A-C, the refund prices of items produced by the manufacturers 12A-C, preferably on a per-class-of-trade basis, and other data related to the manufacturers 12A-C; and a customer database 242 that stores data specific to the customers 20 including, for example, class of trade identification, wholesaler information, address information, etc.

To better explain the operation of the database sub-system 208, FIG. 4 illustrates one example of a structure 300 having multiple pricing/policy records 302 which the reverse distributor 22 may use to generate the refund estimates 40 and/or the disbursement statements 46 (for ease of explanation, pricing/policy records 302 are referred to herein as pricing records 302). A structure 300 includes a set 304 of pricing records 302 stored in the database policy/rules/pricing database 240 in any suitable format such as ASCII, for example. The pricing records 302 may be categorized according to each wholesaler as data sets 306A, 306B, etc. Thus, the data set 306A may correspond to the pricing data for the wholesaler 16A, the data set 306B may correspond to the pricing data for the wholesaler 16B, etc. Within each of the data sets 306A, 306B, etc., the pricing records 302 may be organized according to files specific to classes of trade, e.g., a retail-specific file 308A, a hospital-specific file 308B, and a government-specific file 308C.

FIG. 4 further illustrates one simple example of the pricing record 302 which includes an NDC code field 310 and a price field 312. In this particular example, the price field 302 thus identifies the amount expected to be refunded for a product with the NDC specified in the field 304 if this product has been distributed through the wholesaler 12A in the retail category. Moreover, the pricing record 302 may include additional fields to specify further conditions associated with the return of the product to the manufacturer 12A such as the maximum amount accepted in a single return, for example. The set 304 in other embodiments may be divided at the top level into manufacturer-specific categories. Further, the set 304 also may be divided, at any desired level, according to controlled and non-controlled substance categories.

In some embodiments, the reverse distributor 22 may initially populate some of the records of the policy/rules/pricing database 240 using a third-party database 212. For example, the database 212 may specify the wholesale acquisition cost (WAC) for each product or the WAC discounted at a certain percentage (e.g., 10%). However, because the reverse distributor 22 updates the database 240 based on the information in the credit memoranda 44A-B, pricing and policy information for a certain pharmaceutical product stored in the databases 240 and 212 may be different. Importantly, the adaptive database 240 may reflect the actual refund practices of the manufacturers 12A-C significantly better than the database 212.

In some embodiments, the database 240 stores the refund prices expected to be applied for the corresponding pharmaceutical products. In other embodiments, the database 240 stores the prices paid by the customers 20, and additionally maintains one or several parameters specifying how the price paid must be adjusted to arrive at the corresponding refund price. For example, the database 240 may store the price paid along with a percentage parameter (e.g., 70%), and the estimate calculator 230 during operation may multiply the percentage parameter by the price paid to generate a respective portion of the refund estimate.

Referring to FIG. 5, a diagram 350 illustrates an example relationship between parameters and variables which the reverse distributor 22 utilizes in reconciling line items, generating estimates and disbursement information, adjusting prices and policies for products produced by the manufacturers 12A-B, and applying other techniques discussed herein. In particular, the diagram 350 schematically depicts connections between logical entities such as line item, customer, and job as connector lines marked at each end "one" or "many" to indicate whether a single or multiple values of the logical entity correspond to a particular value of the logical entity at the other end. The connector between credit memo and debit memo labeled "one, one" thus indicates that a particular credit memorandum 44A or 44B corresponds to exactly one debit memorandum 42A or 42B. The connector "many, one" between credit memo and manufacturer, on the other hand, indicates that each manufacturer 12A-B may be associated with multiple credit memoranda 44A-B but each credit memo 44A-B can only correspond to one manufacturer 12A-B (see FIG. 1).

Further, each line item corresponds to a particular NDC, lot number, expiration date and, at least in some embodiments, to other parameters not illustrated in FIG. 5. However, multiple line items may have the same NDC numbers and lot numbers if, for example, these line items are associated with different customers, different expiration dates, or other parameters with non-equal values. Each line item in the diagram 350 also corresponds to exactly only customer entity. In some embodiments, the reverse distributor 22 and, in particular, the computer system may identify each line item as a unique combination of an NDC number, an expiration date, and a lot number. Optionally, the computer system 200 may also generate a unique identifier for each line number stored in the database 182.

As discussed above, each NDC number may uniquely identify a pharmaceutical product. Because pharmaceutical products may be priced differently if distributed by different wholesalers 16A-C or sold in different classes of trade, each NDC entity may be associated with multiple pricing rules. Referring back to FIG. 4, the logical entity pricing rule in the diagram 305 may correspond to the multiple pricing records 302 which the reverse distributor 22 may organize and store in any desired manner.

As discussed above with reference to FIG. 2, several items associated with the same shipment 120, 122A-B, etc. may be processed as parts of a common job, which may be used for organizational and tracking purposes. The diagram 350 thus depicts a logical entity job with a "many, one" relationship with the customer entity because the reverse distributor 22 may process multiple shipments from the customers 20, and assign different job numbers to each instance of processing a shipment if desired. Several jobs may be organized into a batch when associated with a common wholesaler 16A-C or manufacturer 12A-B. The logical entity batch thus has a "one, many" relationship with the entity job, and may be implemented as a unique identifier or a data structure in the computer system 200. In some embodiments, each batch corresponds to jobs associated with a common return program, e.g., a set of procedures, policy and pricing rules defined by a wholesaler for a particular class of trade. The reverse distributor 22 may logically organize multiple jobs into groups with a common batch identity to further improve item tracking, enhance reporting capability, and optimize application of pricing/policy rules to items. As one specific example, an operator interacting with the computer system 200 via the disbursement interface 224 may wish to generate a report of all pending government-class returns to the wholesaler 16B. Using the logical entity batch, the computer system 200 may efficiently identify the relevant jobs, line items, and easily retrieve the corresponding statuses from the database subsystem 208.

Next, FIGS. 6A and 6B illustrate example formats of a debut memorandum 42B and a credit memorandum 44B, respectively, and FIG. 7 illustrates a partial view of an example screen of the line item reconciliation interface 222.

Referring to FIG. 6A, the debit memorandum 42B which the reverse distributor 22 may transmit to the wholesaler 16C (see FIG. 1) may include a field 402 to identify the manufacturer 12B, a field 404 to specify the identity of the debit memorandum 42B, and a field 406 identifying the wholesaler 16C. In this example, the manufacturer 12B may require that all returns be processed by the wholesalers 16A-C, and the reverse distributor 22 may accordingly prepare the relevant pharmaceutical items, and the corresponding documents, for return to the wholesaler 16B which may in turn destroy these items or forward the items to the manufacturer 12B. The product listing area 410 includes several columns to identify each pharmaceutical product (e.g., NDC, lot number), provide a user-friendly description of the product, and specify the quantity of the product and the expiration date of the product. Thus, each row in the product listing area 410 corresponds to one line item, labeled in FIG. 6A as line items 420-428.

If desired, the product listing area 410 also includes a price estimate for the corresponding product and the amount estimate for the line item associated with the product. It will be noted that the reverse distributor 22 may also supply the price and amount estimates to the corresponding customers 20 in the respective refund estimates 40. However, as explained above, each debit memorandum 42B may include line items associated with different customers 20; thus, a line identical or similar to the first line of the product listing area 410 may be included in a refund estimate sent to the government entity 34A, while the second line of the product listing area 410 may appear, also in an exact or a similar form, in a refund estimate sent to the hospital 32B.

Now referring to FIG. 6B, the credit memorandum 44B may identify the debit memorandum 42B to which it corresponds in a field 432. In other words, the fields 404 and 432 in this example include the same alphanumeric string. Further, a field 434 may identify the wholesaler 12B as the source of the credit memorandum 44B, a field 436 may identify the wholesaler 16C, and a field 438 may include a unique identifier of the credit memorandum 44B which the computer system 200 may use in subsequent processing.

In some embodiments, the reverse distributor 32 may format the identity of the debit memorandum 42A or 42B as an alphanumeric string with multiple fields or informational elements. For example, the alphanumeric string may include respective fields to identify one or several of the wholesaler 16A-C, the class of trade of the shipment to which the debit memorandum 42A or 42B corresponds, the identity of the reverse distributor 32, etc. Each field may be in a fixed position in the alphanumeric string or, if desired, the format of the alphanumeric string may be dynamic. Upon retrieving the alphanumeric string from the field 432 of the credit memorandum 44B, for example, the reverse distributor 32 may parse the string to locate the individual fields to retrieve the corresponding information. Alternatively, the reverse distributor 32 may generate unique numbers or alphanumeric strings for use as identity of the debit memoranda 42A-B in a sequential order, randomly, or in any other suitable manner.

If desired, the identity of the debit memorandum 42A or 42B may be used as an "umbrella" number or alphanumeric string associated with several individual debit memoranda. For example, the reverse distributor 32 may generate debit memoranda for each of the retailers 30A and 30B for items to be returned to the same manufacturer 12A, assign an identifier to each debit memorandum, and combine the individual memoranda into an aggregate debit memorandum to be sent to the manufacturer 12A. The reverse distributor 32 may store the association between several client-specific debit memoranda and the aggregate debit memorandum as a look-up table or a linked list, for example. In this manner, the reverse distributor 32 may conveniently exchange a single identity number or string with the manufacturer 12A, while retaining the ability to identify the client-specific debit memoranda in response to receiving the credit memorandum 44A or 44B that includes the identity of the aggregate debit memorandum. The logical relationship between the aggregate debit memorandum and several client debit memoranda incorporated into the aggregate memorandum may be regarded as a parent/child relationship similar to the relationship between a batch and a job discussed above.

A product listing area 440 may identify the pharmaceutical items for which the manufacturer 12B has or will issue credit to the wholesaler 16C (or, alternatively, to the reverse distributor 22). The manufacturer 12B need not follow any particular standard in formatting the credit memorandum 44B, as long as the reverse distributor 22 can ascertain to which line items in the line item database 182 the items 420-426 correspond. The item identity field 442 in this example format specifies the NDC, the lot number, and the expiration date of each item. In some cases, the reverse distributor may further use the field quantity field 444 to identify each line item.

In this example, the amount actually paid for the item 420 is the same as the amount estimated in the debit memorandum 42B. However, the amount paid for the item 422 is lower than the corresponding estimate in the debit memorandum 42B, and the reverse distributor 22 may conditionally lower the price of the product in the database 240 to improve the quality of future refund estimates 40 and the debit memoranda 42A-B. The reverse distributor 22 may similarly raise the price of the product corresponding to the item 426 in the database 240, if an operator or an automated portion of the computer system 200 determines that such an adjustment is necessary. In some cases, the column 446 may provide some guidance to the reverse distributor 22 by optionally specifying the reason why the manufacturer 12B has applied the listed amount.

Conditional adjustment of prices in the database 240 is discussed further with reference to FIG. 7 that illustrates an interface screen 500 of the line item reconciliation interface 222. For ease of explanation, FIG. 7 refers to the example line items 420-426 listed in the debit and credit memoranda 42B and 44B of FIGS. 6A-B. An operator may activate the interface screen 500 upon receiving the credit memorandum 44B by selecting manufacturer 12B in the appropriate menu, for example. The computer system 200 may retrieve the line items listed in the debit memorandum 44B and display these line items in an item listing area 502 next to a reconciliation area 504. For example, the line item 426 has not been credited at all, and the operator may specify the reason (in this case, "policy") using the pull-down selector 506. The operator may specify a different reason, "price," for each of the item 422 and 424.

Some or all selections in the pull-down selector 506 may trigger updates to the database 240. Alternatively, the computer system 200 may include a separate interface which an authorized user (e.g., an administrator, a shift supervisor, etc.) may operate to update the database 240. In some embodiments, confirmations of estimated prices and amounts entered via the interface screen 500 may similarly apply to the database 240. The line item 420, for example, has been credited at precisely the same amount as estimated in the debit memorandum 42B and/or the corresponding refund estimate 40.

Next, FIGS. 8-12 illustrate several methods that the reverse distributor 22 may implement in the computer system of FIG. 3. In general, these methods may be implemented using software, firmware, standard or application-specific hardware, or combinations thereof. Specifically with respect to software embodiments, it is possible to implement the methods of FIGS. 8-12 using any programming language and database applications, in a centralized or distributed manner.

Figure 8:
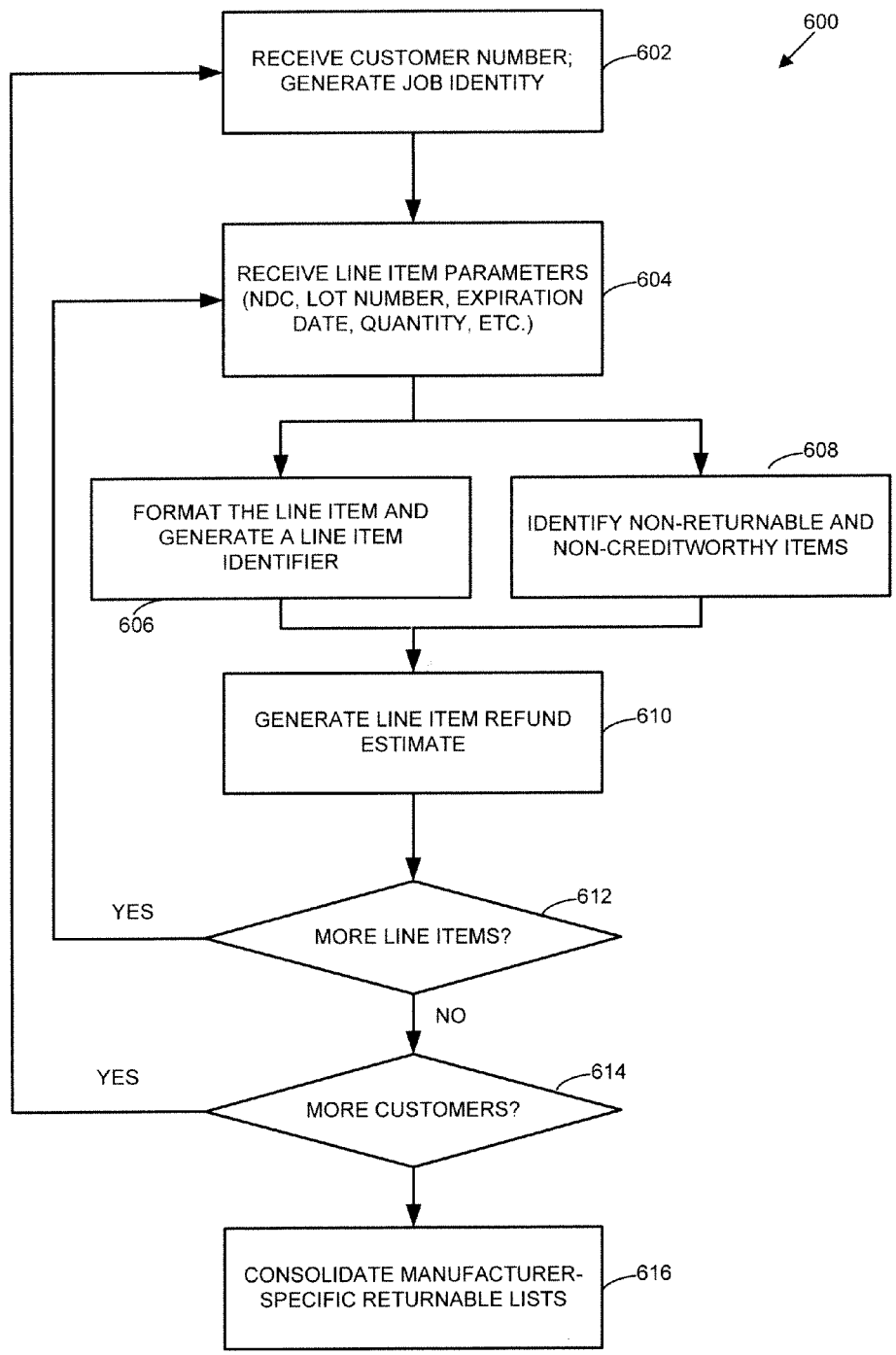
FIG. 8 is a flow diagram of an example method for processing item data which may be implemented by the reverse distributor illustrated in FIG. 1.

Referring to FIG. 8, at least a portion of an example method 600 for processing pharmaceutical items may be implemented in the item tracking interface 220 and the estimate calculator 230. Referring back to FIG. 2, the computer system 200 alone (i.e., automatically) or in cooperation with an operator may execute the method 600 at the data entry stage 108. Similar items at this stage are preferably grouped together in preparation for entering consolidated line items into the database 182. To consider the example of manual data entry, an operator may specify a customer identifier such as a number at block 602. The computer system 200 may assign a new job identity to the subsequent one or multiple entries associated with the customer. Next, the operator may enter information descriptive of multiple line items in blocks 604-612. In particular, the operator may enter the NDC, the lot number, the expiration date, the quantity, and other parameters for every line item at block 604. In response, the computer system 200 may generate a database record for the line item at block 606 to be stored in the line item database 182 and, optionally, a unique identifier for the line item. One of ordinary skill in the art will recognize that each record in a relational database typically has an identifier that is unique at least in the scope of the table in which the record is stored. It is also possible, however, to generate only a logical association between the specified NDC, the lot number, etc., and not allocate a dedicated record for each line item at all.

In some situations, the computer system 200 may automatically recognize certain items as being non-creditworthy or unreturnable. For example, a rule generally similar to the rule 302 illustrated in FIG. 4 may specify that a pharmaceutical product with the NDC code equal to $NDC_i$ can only be returned for credit within 30 days of the expiration date. As another example, a recent policy update in the database 240 may indicate that a product with the NDC code $NDC_j$ is no longer returnable as a retail item. When the computer system 200 identifies these and similar cases in application to a line item entered at block 604, the method 600 may provide a certain indication (e.g., an alert string) to the operator at block 608 as well as to the customer 20 via the respective refund estimate 40 (block 610) and/or the disbursement statement 46. Otherwise, at block 610, the method 600 may automatically generate a refund estimate for the line item using the policy/rules database 240.

The execution of blocks 604, 606 or 608, and 610 may then repeat for each line item (block 612), and the entire procedure also may be repeated for each customer (block 614). Finally, at block 616, the method 600 may consolidate line items returnable to the same ones of the manufacturers 12A-C and the wholesalers 16A-C. Block 616 may include multiple automated and/or manual steps such as executing a database query to locate all line items, possibly associated with different jobs, that are to be returned to the same manufacturer; checking packing compatibility; grouping line items according to classes of trade; etc.

Figure 9:
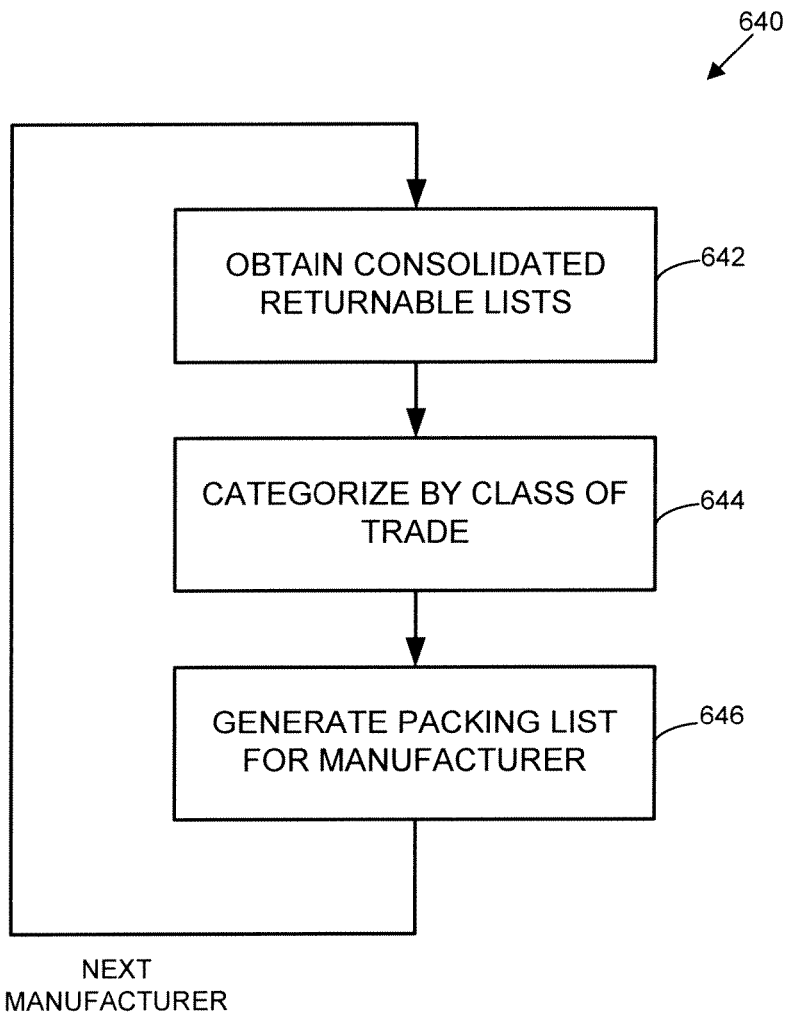
FIG. 9 is a flow diagram of an example method for preparing consolidating items associated with a common supplier which may be implemented by the reverse distributor illustrated in FIG. 1.

Some of the steps which may be associated with block 616 may be performed as a method 640 illustrated as FIG. 9. At block 642, the computer system 200 and/or operators of the reverse distributor 22 may generate lists of line items consolidated according to manufacturers (see the consolidation stage 110 in FIG. 2). Next, at block 644, the line items may be separated according into retail, hospital, government and, if desired, other class-of-trade categories. Finally, at block 646, packing lists may be generated and printed.

Figure 10:
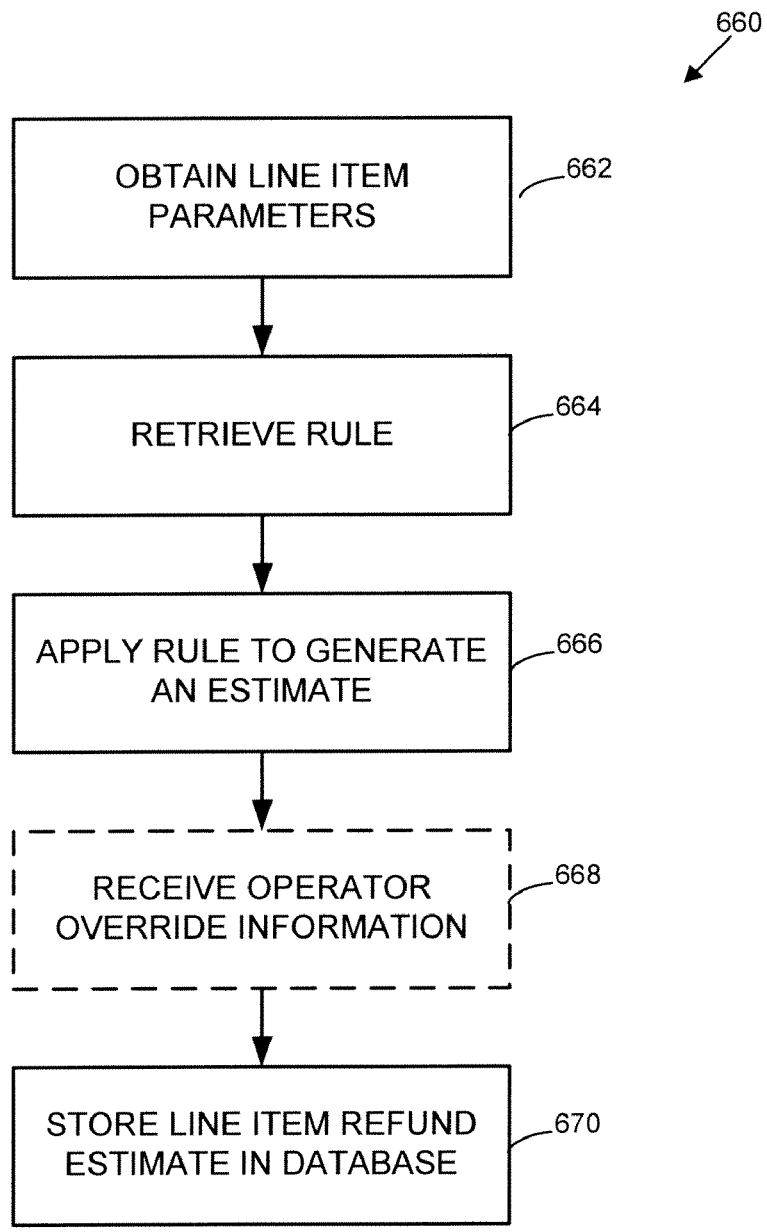
FIG. 10 is a flow diagram of an example method for generating a refund estimate which may be implemented by the reverse distributor illustrated in FIG. 1.

Now referring to FIG. 10, the estimate calculator 320 may execute a method 660 for generating a refund estimate at block 610 of the method 600 (see FIG. 8). After obtaining line item parameters in block 662, the method 660 retrieves an applicable rule from the policy/rules database 240 at block 664. As discussed above with reference to FIG. 4, each rule may specify the pricing and, in some embodiments, additional conditions for each class of trade and each manufacturer or wholesaler. Upon applying the identified rule in block 666, the method 668 may optionally receive an operator override command. In this regard, it will be noted that an authorized operator can preferably modify some or all parameters automatically generated by the computer system 200. For example, the operator may decide that a certain partially filled or damaged container may not qualify for the refund specified by an appropriate pricing file 308A-C. At block 670, the line item refund estimate may be stored in the line item database 182 or in any other location to be used in subsequent credit memorandum analysis, as discussed with reference to FIGS. 6A and 6B.

Figure 11:
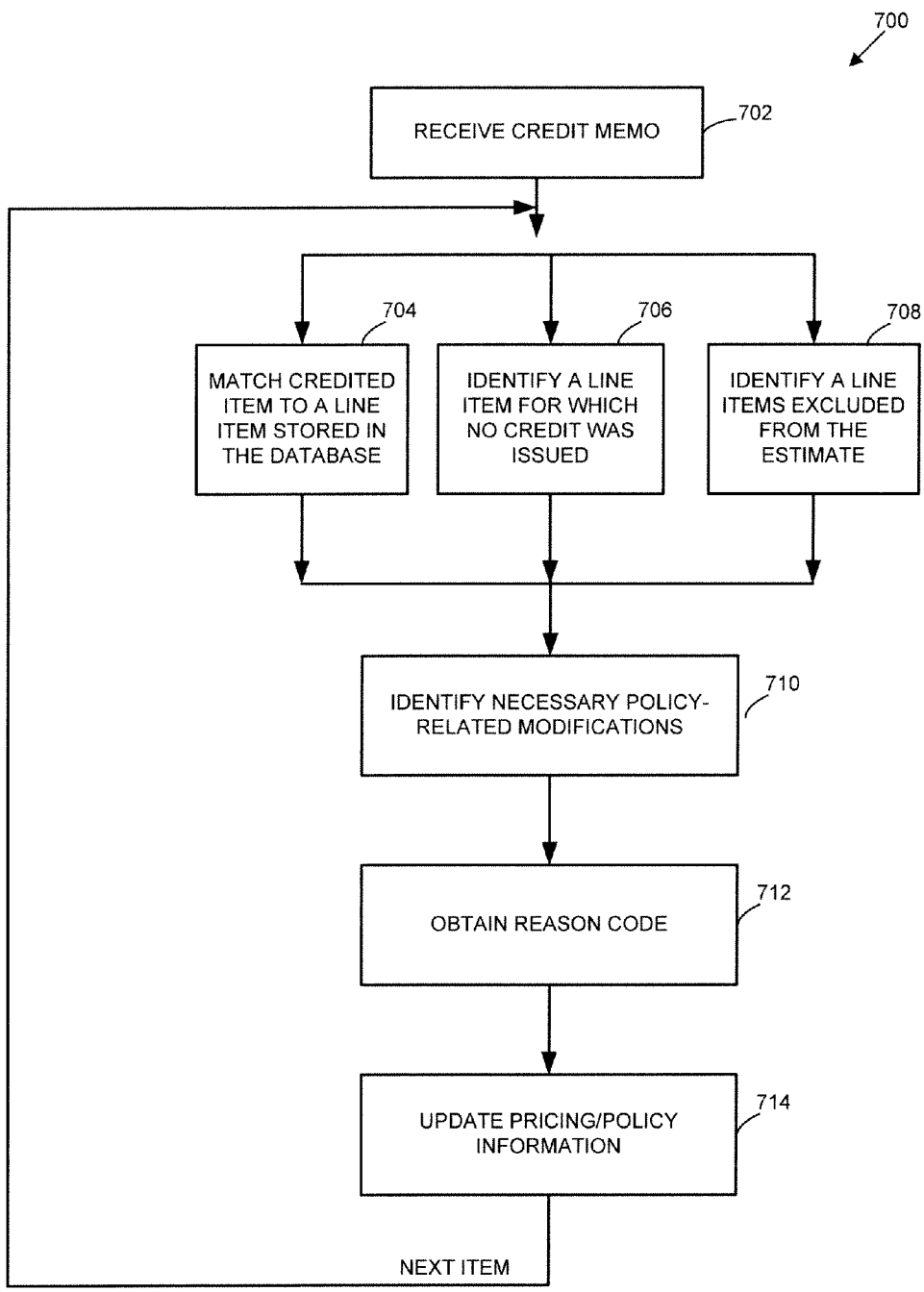
FIG. 11 is a flow diagram of an example method for line item reconciliation and adaptive price/policy learning which may be implemented by the reverse distributor illustrated in FIG. 1.

Next, FIG. 11 illustrates a method 700 for line item reconciliation and adaptive price/policy learning which may be implemented in the policy/price adjustment engine 232 and/or the item tracking engine 236. At block 702, the method 700 receives a credit memorandum 44A or 44B which may be formatted as illustrated in FIG. 6B, for example. Blocks 704-710 specify different types of action which may be performed on each line item in the credit memorandum 44A or 44B. At block 702, the method 700 may identify a line item that is listed in the credit memorandum 44A or 44B and for which a matching record exists in the line item database 182. At block 704, the method 700 may identify a line item for which no credit has been issued according to the credit memorandum 44A or 44B, but which nevertheless has a corresponding database record with a non-zero refund estimate. As discussed above, the operator and/or the computer system 200 in this case may decide to update the policy/rules database 240. Conversely, at block 706, the method 700 may identify a line item in the credit memorandum 44A or 44B for which no record can be located in the line item database 182, or for which the corresponding record lists a zero refund estimate.

At block 710, a possible update to the policy/rules database 240 may be identified based on the difference between the estimated and received amounts, a comment from a manufacturer in the credit memorandum 44A or 44B, or in response to some other detected condition. Further, the method 700 may obtain a reason code at block 712 which may be, for example, specified via the pull-down selector 506 (see FIG. 7). The method 700 may then update the policy/pricing database 240 at block 714, if necessary.

Figure 12:
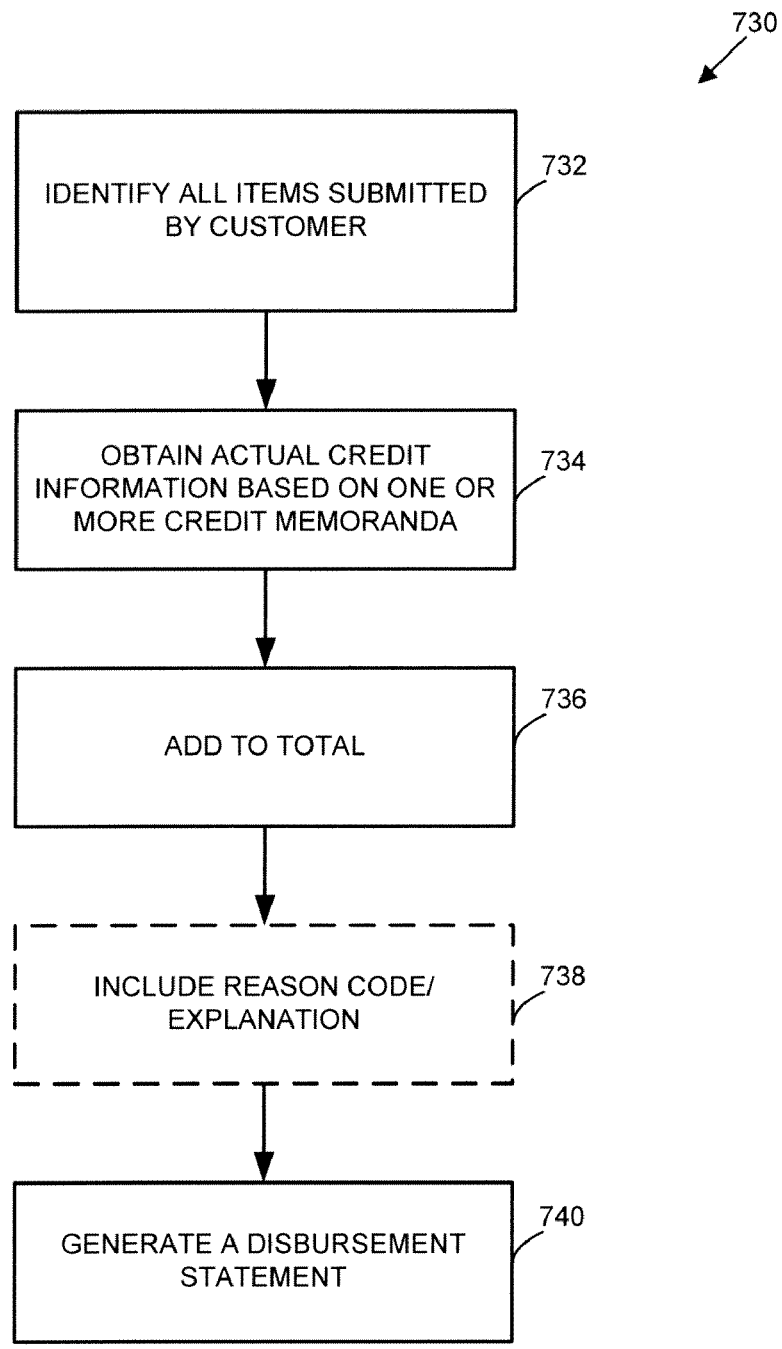
FIG. 12 is a flow diagram of an example method which the reverse distributor of FIG. 1 may implement to generate a disbursement statement for a customer.

Referring to FIG. 12, a flow diagram illustrates an example method 730 for generating a disbursement statement for a customer. The disbursement calculator 234 may execute the method of FIG. 12 in response to a command from the disbursement interface 224, for example. At block 732, all line items associated with the specified customer 20 and stored in the line item database 184 may be identified. Next, at block 734, the method 730 may retrieve actual credit information for some or all of the line items identified at block 732. Because the customers 20 typically submit pharmaceutical items manufactured by several manufacturers 12A-C, actual credit information retrieved at the block 734 may come from multiple credit memoranda 44A-B. In some cases, certain items may be still pending at the time of execution of the method 730, i.e., no credit memorandum may be available. At blocks 736 and 738, the total for the particular customer may be incremented by the amount identified at block 734 and, optionally, a reason or explanation for a possible discrepancy may be included at block 738. Finally, a disbursement statement 46 may be generated at block 740.

Figure 13:
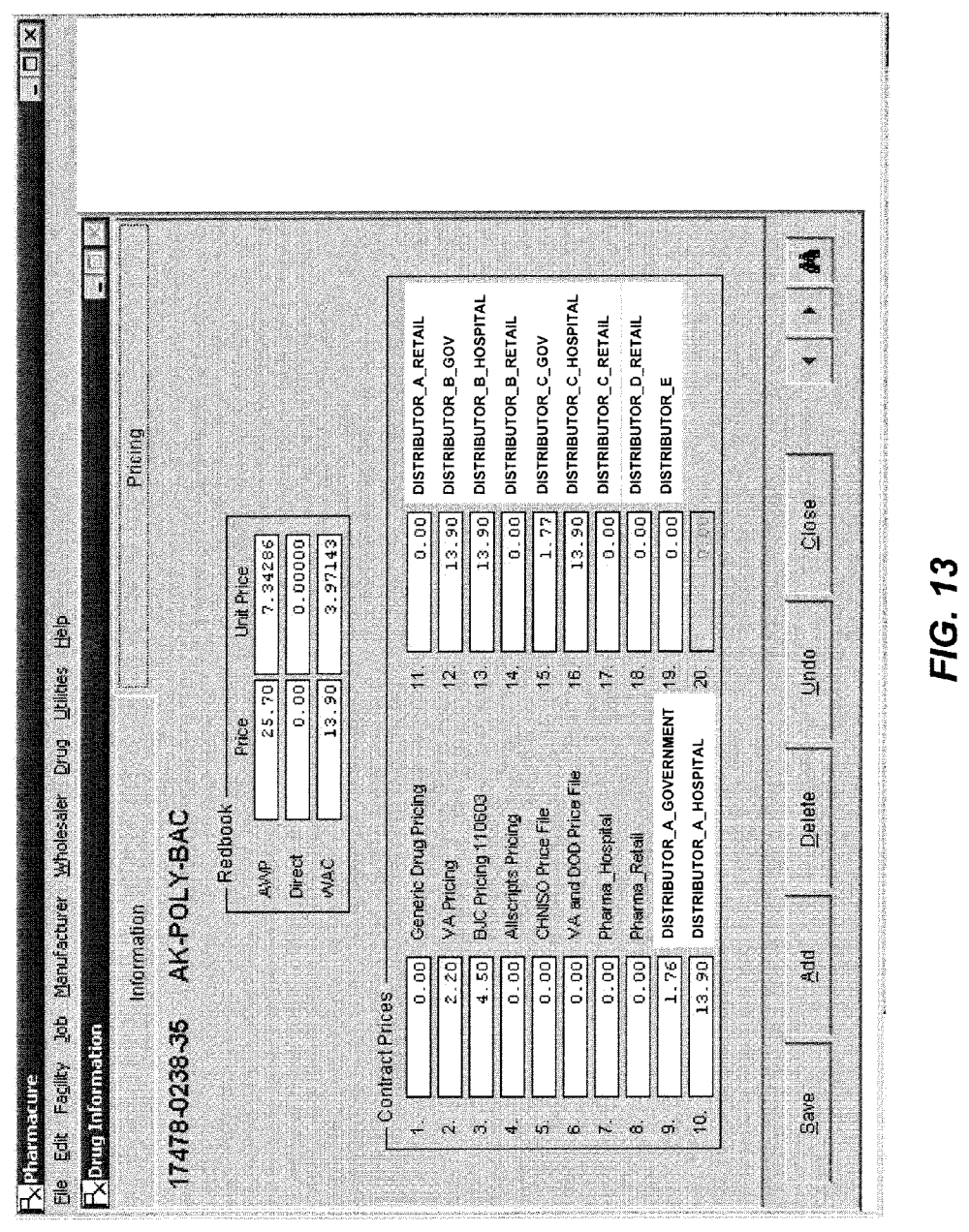
Figure 15:
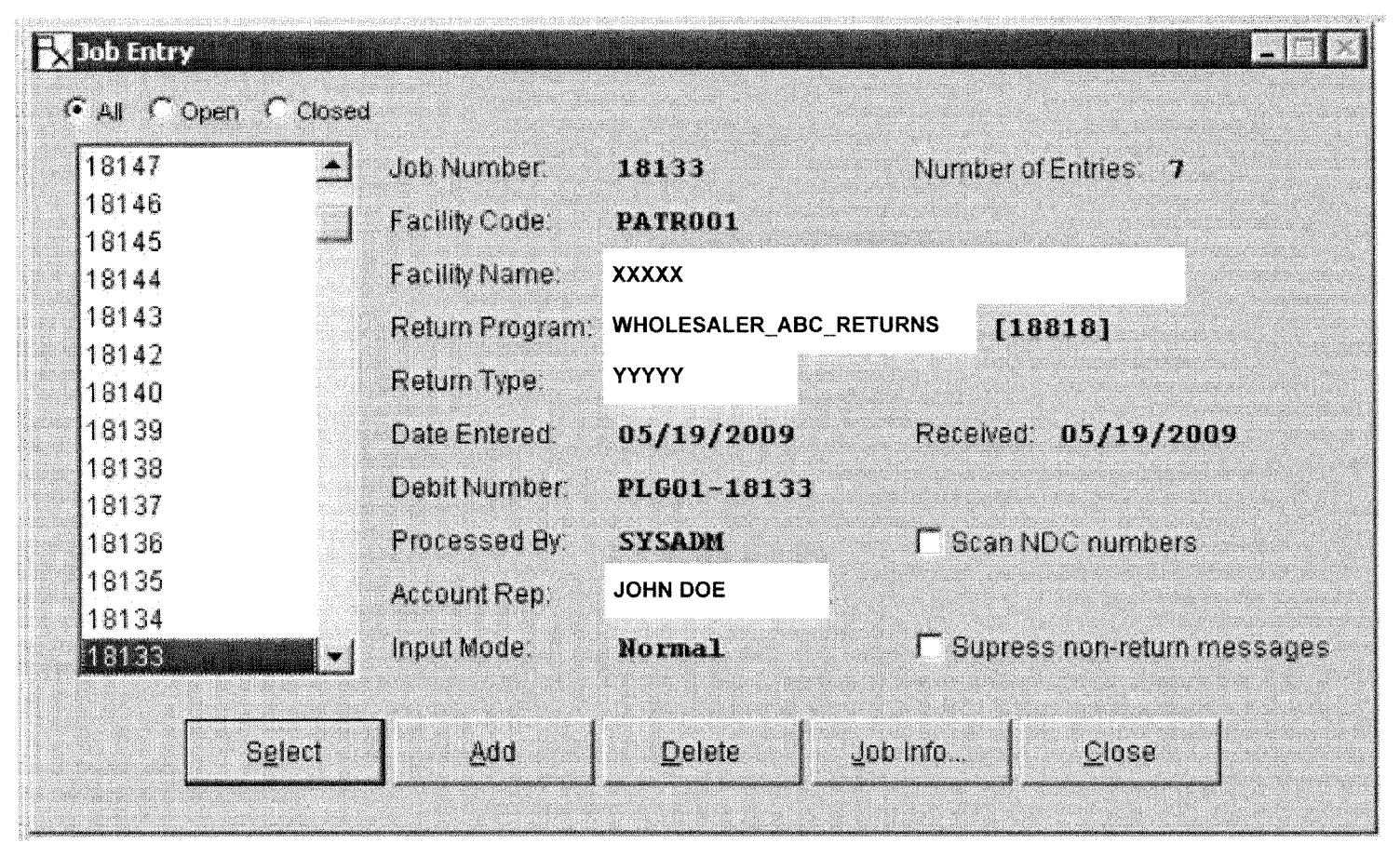

FIGS. 13-15 illustrate further examples of user interface screens which the computer system 200 may implement to conveniently list and edit prices which may be applied to a selected product according to the manufacturer and class-of-trade information (FIG. 13); to list processing jobs associated with a specified batch (FIG. 14); and to list the parameters of a processing job including a link to a corresponding batch (FIG. 15).

While the present system and methods have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method implemented by a third party in a reverse distribution environment for generating an accurate refund estimate for a pharmaceutical item returnable for credit by a customer to a manufacturer, the method comprising:
    receiving an item information at a computer system operated by or for the third party, the item information specifying an identity of the pharmaceutical item, wherein the identity includes a national drug code (NDC), expiration date of the pharmaceutical item, and lot number of the pharmaceutical item;
    retrieving a pricing rule record for the pharmaceutical item from a database on the computer system, wherein the pricing rule record specifies at least an estimated amount of credit expected to be received from the manufacturer for the pharmaceutical item, wherein the estimated amount is based at least partly on the identity of the pharmaceutical item and a class of trade of the customer;
    generating a refund estimate with the computer system, the refund estimate being for use by the customer, wherein the refund estimate is based on at least the estimated amount of credit expected to be received from the manufacturer;
    generating a debit memorandum with the computer system, the debit memorandum listing relevant details regarding the pharmaceutical item including the identity of the pharmaceutical item and quantity of the pharmaceutical item being returned;
    receiving on the computer system a credit memorandum issued by the manufacturer indicative of the identity of the pharmaceutical item and an actual amount of credit payable by the manufacturer for the pharmaceutical item, the credit memorandum being responsive to the debit memorandum;
    comparing the actual amount of credit to the estimated amount of credit expected to be received from the manufacturer with the computer system to identify a difference between the estimated amount and the actual amount indicated by the credit memorandum;
    identifying a reason for the difference identified in the comparing step, wherein the reason relates to at least one of identity of the customer, the expiration date of the pharmaceutical item, and whether the pharmaceutical item is eligible for return in a selected class of trade; and
    adjusting the pricing rule record on the computer system if the actual amount of credit is not equal to the estimated amount of credit in view of the identified reason for the difference.

2. The method of claim 1, wherein generating the refund estimate includes adjusting the item refund estimate in view of the expiration date of the pharmaceutical item.

3. The method of claim 1, further comprising:
    generating a line item record including the NDC, the expiration date, the lot number, and an identity of the customer; and
    storing the line item record in a computer-readable memory.

4. The method of claim 1, wherein the customer is associated with one of a plurality of classes of trade including a retail class, a hospital class, and a government entity class; and wherein retrieving the pricing rule record includes selecting the pricing rule record in view of the one of the plurality of classed of trade.

5. The method of claim 4, wherein the pharmaceutical item is associated with one of a plurality of wholesalers; and wherein retrieving the pricing rule record includes selecting the pricing rule record further in view of the one of the plurality of wholesalers.

6. The method of claim 1, wherein the pricing rule further specifies a set of conditions associated with the estimated amount of credit; wherein the set of conditions defines at least a portion of a refund policy associated with the manufacturer and the pharmaceutical item; and wherein generating the refund estimate is further based on the refund policy.

7. The method of claim 1, further comprising:
receiving an initial price estimate for the pharmaceutical item from an external provider prior to generating the refund estimate; and
assigning the initial price estimate to the pricing rule record.

8. The method of claim 7, wherein the initial price estimate is based on a wholesale acquisition cost (WAC) of the pharmaceutical item.

9. The method of claim 1, wherein conditionally adjusting the pricing rule record includes:
receiving the reason as part of a reason notification from the manufacturer associated with the actual amount of credit; and
adjusting the pricing rule record according to the reason notification.

10. The method of claim 1, wherein comparing the actual amount of credit to the estimated amount of credit includes providing an item reconciliation interface, comprising:
displaying the identity of the pharmaceutical item;
displaying the estimated amount of credit;
displaying the actual amount of credit;
providing a user-editable field to receive an amount of credit to be applied to the customer; and
providing a user-editable control to select one of a plurality of reason identifiers, wherein each of the plurality of reason identifiers identifies a reason for a difference between the actual amount of credit and the estimated amount of credit.

11. The method of claim 10, wherein the plurality of reason codes includes a policy change and a price adjustment.

12. An apparatus for generating an accurate refund estimate in a reverse distribution environment, the apparatus comprising:
a computer system;
an item tracking interface implemented by the computer system to receive item data for an aggregate set of items returnable for credit from a plurality of customers to one or more suppliers;
a pricing rule database stored in a computer readable memory, the pricing rule database storing pricing rule records for at least some of the items in the aggregate set, wherein each pricing rule record specifies an amount of credit expected to be received for the corresponding item;
a refund estimate calculator implemented by the computer system to generate a refund estimate for a selected one of the plurality of customers using the pricing rule records stored in the pricing rule database, wherein the refund estimate corresponds to an amount of credit expected to be received for the items in the aggregate set that are associated with the selected one of the plurality of customers;
a credit processing module implemented by the computer system to process a credit memorandum issued by the one or more suppliers for the aggregate set of items, wherein the credit memorandum includes data indicative of an amount payable by the one or more suppliers for each item in the aggregate set of items; and
an estimate adjustment engine implemented by the computer system to compare the data in the credit memorandum to the pricing rule records and adjust the pricing rule records using the credit memorandum, wherein the adjusting is conditional in view of an identified reason for any difference between the refund estimate and the amount payable, the pricing rule record is adjusted to reflect the identified reason, and the identified reason relates to at least one of identity of the customer, the expiration date of the item, and whether the item is eligible for return in a selected class of trade.

13. The apparatus of claim 12, wherein the computer system comprises a plurality of interconnected digital computers, and wherein the item tracking interface includes:
a first control to receive an identity of a product to which one or several ones in the aggregate set of items correspond;
a second control to receive a quantity associated with the product; and
a third control to receive an identity of one of the plurality of customers with whom the product is associated; wherein the identity of the product, the quantity associated with the product, and the identity of the one of the plurality of customers collectively define a respective line item; the computer system further comprising:
an item tracking engine to generate a line item record including the identity of the product, the quantity associated with the product, and the identity of the one of the plurality of customers; and
a line item database to store the line item record.

14. The apparatus of claim 13, wherein the line item record further includes a line item estimate; wherein the line item estimate corresponds to an amount of credit expected to be received for the line item; and wherein the credit processing module includes a line item reconciliation interface to display the line item estimate and the amount payable for the item corresponding to the line item record, and receive a selection of an amount to be allocated to the one of the plurality of customers.

15. The apparatus of claim 13, further comprising a disbursement calculator implemented by the computer system to generate a disbursement statement for the selected one of the plurality of customers using the credit memorandum.

16. An apparatus for generating an accurate refund estimate for a pharmaceutical product, wherein the pharmaceutical product is manufactured by a manufacturer, purchased by a customer, and returnable for credit by the customer to the manufacturer, the apparatus comprising:
a computer system;
an item tracking interface to receive line item data corresponding to the pharmaceutical product, wherein the line item data includes a national drug code (NDC) of the pharmaceutical product, an expiration date of the pharmaceutical product, and an identity of the customer;
a first database stored on a computer readable memory, the first database storing a plurality of pricing rule records associated with the pharmaceutical product, wherein the plurality of pricing rule records corresponds to a respective plurality of pricing programs, and wherein each of the plurality of pricing rule records specifies a respective amount of credit expected to be allocated by the manufacturer to the customer for the pharmaceutical product in view of an identity and/or class of trade of the customer;

an estimate calculator implemented by the computer system to select one of the plurality of pricing rule records and generate a refund estimate for the pharmaceutical product using the selected one of the plurality of pricing rule records;

an item tracking engine to generate a line item record including the line item data and the refund estimate;

a credit processing module to process a credit memorandum issued by the manufacturer, wherein the credit memorandum specifies an actual amount of credit allocated by the manufacturer for the pharmaceutical product; and an estimate adjustment engine implemented by the computer system to adjust the one of the plurality of pricing rule records if the actual amount is different from the refund estimate in view of a reason identified for the difference, and to adjust the pricing rule record to reflect the reason for the difference, wherein the reason relates to at least one of the identity of the customer, the expiration date of the pharmaceutical item, and whether the pharmaceutical item is eligible for return in a selected class of trade.

17. The apparatus of claim 16, wherein each in the plurality of pricing programs is associated with a respective one of a multiplicity of classes of trade, wherein the multiplicity of classes of trade includes a retail class, a hospital class, and a government entity class.

18. The apparatus of claim 17, wherein each in the plurality of pricing programs is further associated with a respective one of a multiplicity of wholesalers.

19. The apparatus of claim 16, wherein the estimate calculator selects the one of the plurality of pricing rule records based on the identity of the customer.

20. The apparatus of claim 16, further comprising a disbursement calculator to generate a disbursement memorandum including the actual amount of credit.

* * * * *